United States Patent [19]
Davis

[11] Patent Number: 5,209,615
[45] Date of Patent: May 11, 1993

[54] BORING BAR SUPPORT MEANS

[75] Inventor: Charles L. Davis, St. Louis, Mo.

[73] Assignee: Sunnen Products Company, St. Louis, Mo.

[21] Appl. No.: 869,140

[22] Filed: Apr. 14, 1992

[51] Int. Cl.⁵ ............................................. B23B 41/12
[52] U.S. Cl. ........................................ 408/54; 408/79; 408/708
[58] Field of Search ...................... 408/54, 79, 80, 708

[56] References Cited

U.S. PATENT DOCUMENTS

| | | |
|---|---|---|
| 1,836,078 | 12/1931 | Litter . |
| 1,885,773 | 11/1932 | Shoemaker . |
| 1,939,786 | 12/1933 | Mooers . |
| 2,250,788 | 7/1941 | Arp . |
| 2,651,221 | 9/1953 | Foster . |
| 2,964,978 | 12/1960 | Alafouzos . |
| 4,132,494 | 1/1979 | Aldridge, Jr. ........................ 408/54 |
| 4,213,721 | 7/1980 | Aldridge, Jr. ........................ 408/54 |
| 4,451,186 | 5/1984 | Payne ................................... 408/54 |
| 4,652,186 | 3/1987 | Sverdlin ................................ 408/81 |
| 4,730,958 | 3/1988 | Banoczky ............................. 408/54 |
| 4,979,850 | 12/1990 | Dompe ............................. 408/72 R |

Primary Examiner—Daniel W. Howell
Attorney, Agent, or Firm—Haverstock, Garrett & Roberts

[57] ABSTRACT

An improved support mechanism for supporting a boring bar at spaced locations along its length within a workpiece during a boring operation, the present support mechanism being particularly adaptable for precision in-line boring of the cam shaft bores associated with overhead cam cylinder heads such as the Ford Escort overhead cylinder head presently in use and being specifically directed to centrally supporting the boring bar intermediate the respective opposite end portions of the cylinder head or other workpiece, the present support mechanism including a first annular member slidably positionable on the boring bar at an intermediate location along its length, the annular member being constructed to enable the boring bar to rotate freely therein, a second member slidably positionable within any one of the lifter bores associated with the particular cylinder head or other workpiece to be rebored, the second member including a locking mechanism for locking the second member within any one of the lifter bores, and a mechanism for attaching the first annular member to the second member when the boring bar is positioned within the in-line cam shaft bores.

14 Claims, 3 Drawing Sheets

BORING BAR SUPPORT MEANS

The present invention relates generally to boring bar support means utilized for precision in-line boring of internal combustion engines and like mechanisms and, more particularly, to a support mechanism wherein the boring bar is centrally supported by means positioned internally within the particular cylinder head to be re-bored. Although the present support means were specifically developed for use in re-boring the cam shaft bearing bores associated with standard production models of the Ford Escort style cylinder head, it is recognized and anticipated that the present support means can likewise be adapted for use in re-boring cam shaft and crank shaft bores associated with other engines and like mechanisms.

BACKGROUND OF THE INVENTION

Typically, cam shaft and crank shaft bearings in internal combustion engines become worn and damaged due to a multitude of reasons and must therefore be repaired and/or replaced. Lack of lubrication and/or overheating of such engines are attributable to many such problems. Rectification of this situation usually requires re-boring of the engine head or block along the axis of the cam shaft or crank shaft so that new oversized bushings and bearings or an oversized cam shaft or crank shaft can be installed in place of the worn parts. Because cam shaft and crank shaft bearing bores are positioned and located in alignment in either the cylinder head or the engine block, re-boring of such surfaces is difficult since there is a need to carefully center and align the boring tool within such bores so that all surfaces can be accurately re-bored simultaneously. Techniques currently available for accomplishing this task typically include a pair of external support arm members attachable to the boring machine itself, the support arm members including means for holding the boring bar and each being movable exterior of the cylinder head or block to properly support the boring bar for the particular boring application. Due to the construction of many overhead cam cylinder heads and, more particularly, the Ford Escort overhead cam cylinder head, the known conventional techniques for externally supporting the boring bar within the in-line cam shaft bores of such cylinder heads do not provide adequate support for re-boring those cam bores located towards the center of the cylinder head. This is true because the construction of such overhead cam cylinder heads such as the Ford Escort head are such that they will not allow engagement of the conventional overhead support arms associated with the known boring machines with the boring bar at a central location therealong. This lack of sufficient central support causes the boring bar to chatter and vibrate when re-boring these particular bores and this produces an unacceptable, out-of-round bore.

Since, today, more and more vehicles are equipped with overhead cam cylinder heads, there is a growing necessity for in-line boring of such cylinder heads in order to repair operating damage thereto as outlined above. For example, in-line boring may be required to restore proper cam shaft alignment, or such machining operation may be necessary to repair bearing surfaces damaged by spun journals. Also, importantly, since todays modern engines run at much higher operating temperatures, damage due to overheating such as blown head gaskets and/or warped cylinder heads are likewise commonplace. A need therefore exists for support means capable of adequately supporting a boring bar at a central location therealong when in-line boring certain types of overhead cam cylinder heads and other like mechanisms such as the Ford Escort style cylinder head.

SUMMARY OF THE INVENTION

The present invention teaches the construction and operation of a boring bar support means capable of centrally supporting a boring bar internally within the overhead cam cylinder head itself. This is accomplished through the use of a two-piece support fixture assembly comprising a bushing or collar member and a center bushing support member. The present support means is specifically designed for use with a standard boring bar, the boring bar having a plurality of spaced openings located therealong for receiving and holding the cutter members. The bushing or collar member is first assembled onto the boring bar at a predetermined location and thereafter the individual cutter members associated with the boring bar are assembled at spaced locations along the length thereof. Once the present bushing member and the cutting members are positioned and located on the boring bar, the boring tool is ready for insertion through the respective cam shaft bores of the particular cylinder head to be re-bored. Alignment of the boring bar with the centerline or longitudinal axis extending through all of the bores to be re-bored is accomplished through the use of the external boring bar support arms associated with a typical boring machine. These support arm members are positioned and aligned on the boring machine adjacent the respective opposite end portions of the cylinder head or other workpiece mounted thereon in accordance with known procedures set forth in the operations manual associated with the particular boring machine being used as will be hereinafter further explained. Once this orientation and alignment is accomplished, the entire boring bar assembly with the bushing member assembled thereon is inserted through the external support arms of the boring machine and through the in-line bores located inside the cylinder head. The centerline of the boring bar will now be in proper axial alignment with the centerline of the respective in-line cam bores.

The cylinder head includes a plurality of lifter bores located perpendicular to the axis of the aligned cam shaft bores. When inserted, the boring bar is positioned such that the bushing member is located directly beneath a pre-selected one of the lifter bores in the cylinder head. When so positioned, the center support member, which member is specifically sized and dimensioned so as to be insertably positioned within any one of the lifter bores, is positioned within the appropriate lifter bore and is attached to the bushing member by means of a conventional fastening member such as a set screw. In this regard, the bushing member includes a threaded opening adaptable to receive the fastening member inserted through the center support member, the threaded opening in the bushing member being placed in registration with the lifter bore when the bushing member is positioned therebeneath. Use of the fastening member fixedly secures the center support member to the bushing member and holds the bushing member in place so that the boring bar can be freely rotated and moved therethrough during a cutting operation.

The center support member also includes wedge or cam lock means for fixedly securing such member within the lifter bore. This further secures the center support member as well as the bushing member in a fixed position within the cylinder head and provides a strong, stable support for the boring bar at such location.

Once the boring operation is completed, the cam or wedge lock means associated with the central support member is disengaged from the walls of the lifter bore, the threaded fastener member extending through the support member and threadedly engaging the bushing member is removed, the center support member is removed from the lifter bore, the boring machine support arm members are disengaged and removed, and the boring tool along with the bushing member positioned therearound are removed from the cylinder head.

The present boring bar support means provides a strong, stable platform for centrally supporting a boring bar intermediate the opposite end portions of a particular workpiece to be re-bored. Use of the present support means eliminates the aforementioned chatter and vibration normally produced when re-boring in-line bores associated with overhead cam cylinder heads and other workpieces where known conventional support mechanisms cannot be utilized to provide adequate central support for the boring bar. This greatly improves the overall accuracy and surface finish of the boring operation. Since the center support member of the present invention is easily and quickly slidably positionable and securable within any one of the lifter bores associated with a particular cylinder head to be re-conditioned, use of the present support mechanism requires minimal set-up and tear-down time for multiple boring operations.

It is therefore a principal object of the present invention to teach the construction and operation of a boring bar support means for use in precision in-line boring of certain types of overhead cam cylinder heads and other like mechanisms.

Another object is to provide means for supporting a boring bar internally within the cylinder head or engine block itself.

Another object is to provide a boring bar support mechanism which provides adequate support for simultaneously re-boring all in-line bores associated with a particular workpiece in a single boring operation.

Another object is to provide a boring bar support means which is particularly adaptable for use with standard production models of the Ford Escort style cylinder head.

Another object is to provide a boring bar support means wherein the boring bar is centrally supported by a mechanism insertable within any one of the lifter bores associated with a particular type cylinder head.

Another object is to teach the construction and operation of a boring bar support means which eliminates the chatter and vibration of the boring bar normally produced when re-boring overhead cam cylinder heads via other support mechanisms.

Another object is to provide a boring bar support assembly which will improve the accuracy of a boring operation.

Another object is to provide a mechanism for adequately supporting a boring bar at a central location therealong when in-line boring certain types of overhead cam cylinder heads and other like mechanisms.

Another object is to teach the construction of a boring bar support assembly which is relatively easy to position and assemble for operative use.

These and other objects and advantages of the present invention will become apparent to those skilled in the art after considering the following detailed specification in conjunction with the accompanying drawings.

DETAILED DESCRIPTION OF THE INVENTION

Figure 1:
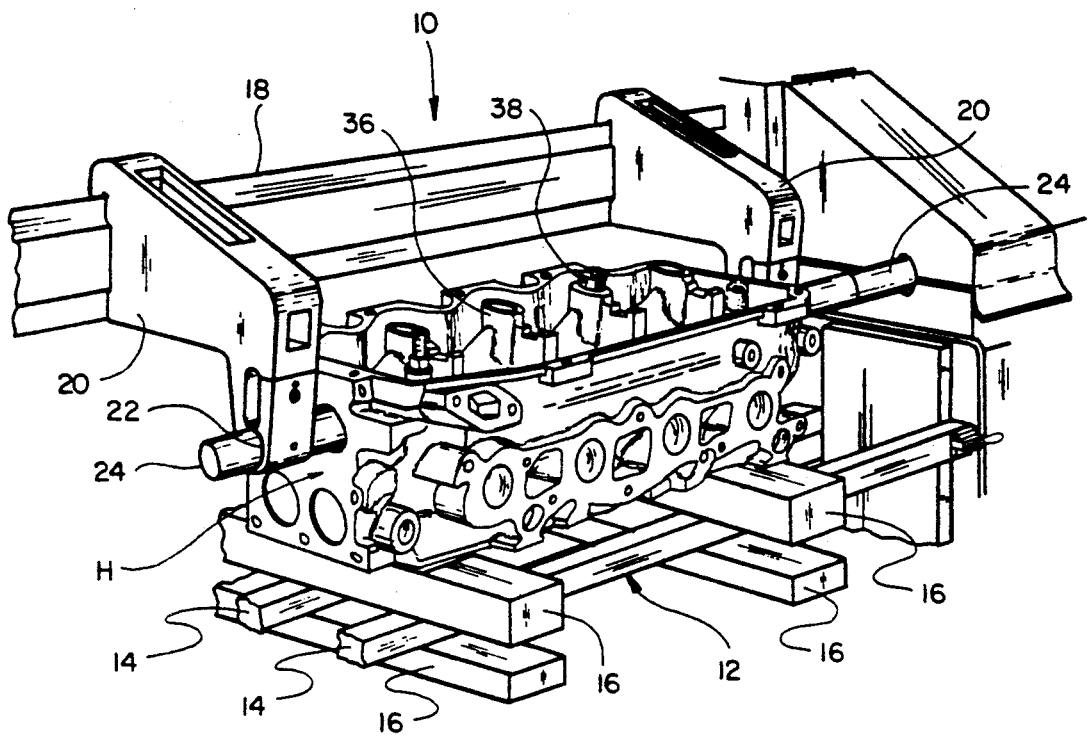
FIG. 1 is a partial perspective view of a typical cam boring machine having an overhead cam cylinder head positioned thereon for a boring operation, FIG. 1 further illustrating the use of a pair of typical overhead support arm members attachable to the boring machine for supporting the boring bar exterior of the cylinder head.

Referring to the drawings more particularly by reference numbers wherein like numerals refer to like parts, number 10 in FIG. 1 identifies a typical cam boring machine commonly used for re-boring and/or re-conditioning cam shaft bores associated with a wide variety of cylinder heads such as the Sunnen Cam Boring Machine Model CB-24000. Although different types of cam boring machines are presently being used throughout the industry and some variations do exist between such various machines, the cam boring machine 10 illustrated in FIG. 1 is representative of many of such boring machines. The cam boring machine 10 includes a cradle assembly 12 which, among other things, includes a pair of table rails 14 which run substantially the entire length of the machine frame. Two pairs of parallel clamp bars 16 are mounted to the table rails 14 and, along with appropriate mounting studs and clamp nuts, are used to clamp the cylinder head H in proper position on the table rails 14. The cradle assembly 12 is movable up and down so as to position and align the cylinder head H with the drive head assembly associated with the boring machine 10.

The boring machine 10 also includes a support rail member 18 to which may be attached any plurality of overhead support arm members 20 as shown in FIG. 1. The support rail member 18 is located towards the top of the boring machine 10 and, like the table rails 14, extends substantially the full length of the machine frame associated therewith. The overhead support arm members 20 lock onto the rail member 18 and provide support for the boring bar 24 as will be hereinafter explained. The support arm members 20 each include means in the form of a bushing or sleeve 22 through which the boring bar 24 is inserted and held. The overhead support arm members 20 are slidably movable along the support rail 18 and at least two such members 20 are normally positioned adjacent the respective opposite end portions of the particular workpiece mounted on the cradle assembly 12 such as the cylinder head H shown in FIG. 1. Depending upon the overall size of the particular cylinder head, engine block or other workpiece being re-bored, use of just two support arm members 20 as shown in FIG. 1 may provide adequate support to the boring bar along its entire length for the particular boring operation desired. If, however, the spanwise distance between the overhead support arm members 20 is generally more than approximately 15 inches, additional support for the boring bar intermediate the opposite end portions of the workpiece will be required.

Typically, the construction of many cylinder heads, engine blocks and other workpieces enable the support arm members 20 to likewise be positioned intermediate the respective opposite end portions thereof so as to provide additional support to the boring bar during a boring operation. Use of additional support members 20 at locations intermediate the respective opposite end portions of a particular workpiece is possible due to the fact that the construction of such workpieces, and, particularly, the construction of conventional cylinder heads and engine blocks, enables the bushing or sleeve portion 22 of such arm members 20 to be inserted between the opposite end portions of the particular workpiece and in alignment with the particular bores to be re-bored without interference or other obstruction from the actual structure of such workpiece. This is not true of many of the new overhead cam cylinder head designs such as the Ford Escort overhead cam cylinder head wherein such constructions prohibit use of the support arm members 20 at any location intermediate the respective opposite end portions of such cylinder head. In such cases, the support arm members 20 are only usable exterior of the cylinder head itself adjacent the respective opposite end portions thereof as shown in FIG. 1. In most such cases, such an external support arrangement does not provide adequate support for re-boring the cam shaft bores associated with such overhead cam cylinder heads since, due to the size of such heads, the center portion of the boring bar lacks adequate support. This lack of sufficient support causes the boring bar to chatter and vibrate when re-boring these particular types of cylinder heads and this typically produces unacceptable out-of-round bores.

Figure 3:
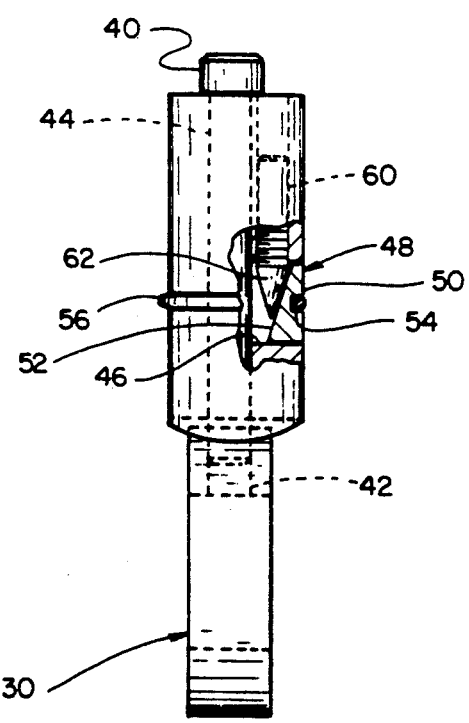
FIG. 3 is a side elevational view of the support mechanism shown in FIG. 2, the cam lock mechanism associated with the present invention being shown in partial cross-section.
Figure 2:
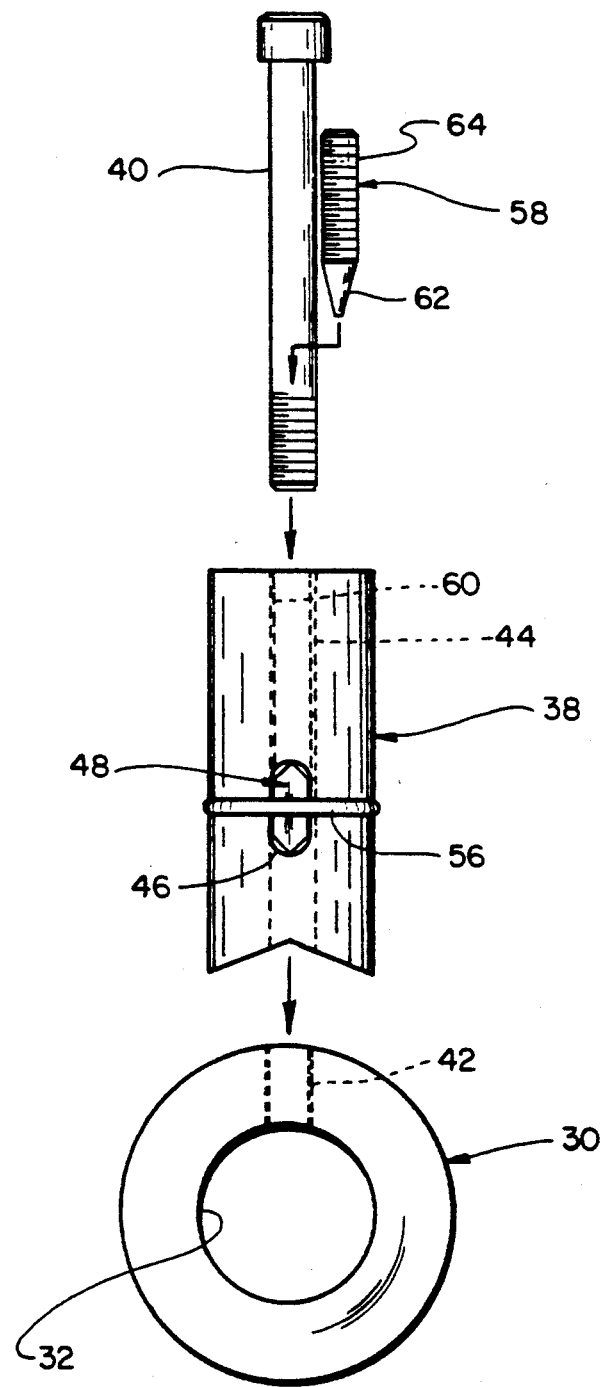
FIG. 2 is an exploded front elevational view of the present boring bar support mechanism constructed according to the teachings of the present invention.
Figure 4:
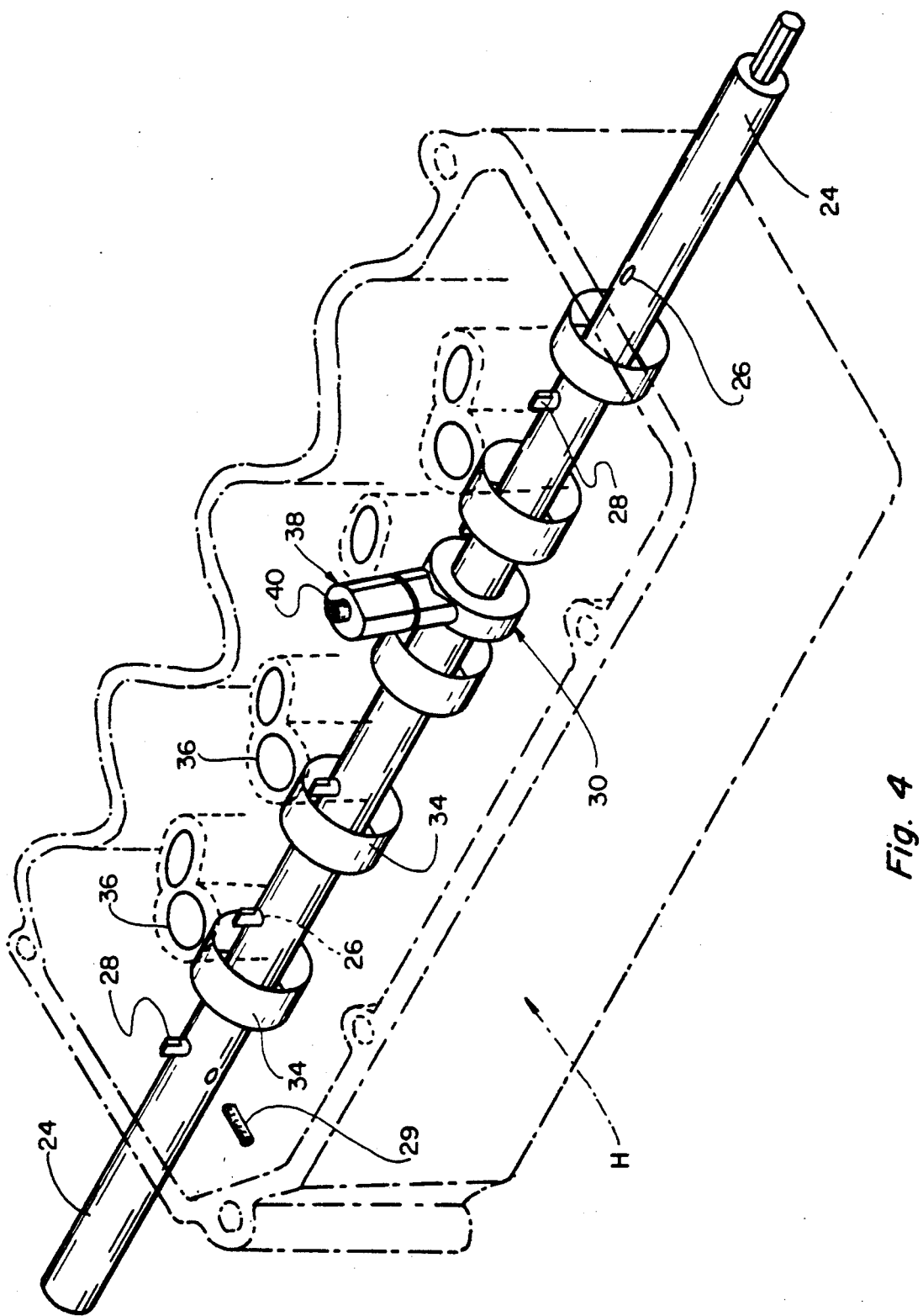
FIG. 4 is a partial perspective view of the boring bar support assembly of FIGS. 2 and 3 shown in operative position within an overhead cam cylinder head, the overhead cam cylinder head being shown in dotted outline form.

FIGS. 2-4 illustrate the present means for supporting a boring bar internally within the cylinder head itself. The present support mechanism includes a bushing or collar member 30 having a central opening 32 associated therewith which is sized and dimensioned so as to slidably receive the boring bar 24 therethrough as best shown in FIG. 4. The opening 32 should be such that it allows the boring bar to freely rotate therewithin and axially move therethrough. The bushing member 30 is specifically designed for use with a standard boring bar such as the boring bar 24, the boring bar 24 having a plurality of spaced openings 26 located therealong for receiving and holding the tool bits or cutter members 28 as shown in FIG. 4. Each of the plurality of spaced cutter openings 26 likewise has a corresponding lock screw 29 associated therewith for locking the particular tool bit or cutter 28 in operative position on the boring bar 24. The particular spacing between the cutter members 28 is dictated by the particular workpiece to be re-conditioned, and in this case, by the spacing between the in-line cam bores 34 associated with the cylinder head H as shown in FIG. 4. It is recognized that the central opening 32 of annular member 30 can be varied to receive any particular boring bar construction.

The bushing member 30 is first assembled on the boring bar 24 at a predetermined location and thereafter the individual cutter members 28 are assembled at predetermined spaced locations along the length of the boring bar based upon the spacing between the in-line cam bores 34. The tool bits or cutter members 28 are positioned adjacent one side of each respective cam shaft bore 34 as shown in FIG. 4 and each are adjusted to the proper, predetermined cutting height by conventional means. Use of a boring bar with multiple cutting locations enables all bearing journals or cam shaft bores such as the bores 34 to be re-bored simultaneously.

Once the present bushing member 30 and the cutting members 28 are positioned and located on the boring bar 24, this assembly is ready for insertion through the respective cam shaft bores 34 (FIG. 4). In this regard, alignment of the boring bar 24 with the centerline or longitudinal axis extending through all of the bores 34 to be re-bored is critical, and this is accomplished through the use of the support arm members 20. The support arm members 20 are positioned and aligned on the boring machine 10 adjacent the respective opposite end portions of the cylinder head H mounted thereon as shown in FIG. 1 in accordance with known procedures set forth in the operations manual associated with the particular boring machine being used. Such procedures typically include manually aligning the centerline of the bushing or sleeve 22 with the longitudinal axis of the plurality of in-line bores 34 to be re-bored through the use of a run-out indicator or other device for achieving proper axial alignment. Once this orientation and alignment is accomplished, the boring bar 24 with the tool bits 28 and bushing member 30 assembled thereon is inserted through the sleeve portions 22 of the support arm members 20 and through the in-line bores 34 as best illustrated in FIG. 4. The centerline of the boring bar 24 is now in proper axial alignment with the centerline of the respective in-line cam bores 34. In this regard, it is important to note that the overall size and shape of the bushing member 30 is such that the member 30 will pass through the various bores 34 to be re-bored so that it can be positioned and located intermediate the respective opposite end portions of the cylinder head H at a predetermined location.

The cylinder head H includes a plurality of lifter bores 36 located perpendicular to the plurality of cam shaft bores 34 as best illustrated in FIGS. 1 and 4. The boring bar 24 is positioned within the cylinder head H such that the bushing member 30 is located directly beneath a pre-selected one of the lifter bores 36. When so positioned, the center support member 38 is positioned within the appropriate lifter bore 36 and is attached to the bushing member 30 by means of a conventional fastening member such as the set screw 40 illustrated in FIGS. 2 and 3. The center support member 38 is specifically sized and dimensioned so as to be insertably positioned within any one of the lifter bores 36. Also, the bushing member 30 includes a threaded opening 42 adaptable to receive the fastening member 40 which is inserted through the opening 44 extending longitudinally through the center support member 38 as best shown in FIGS. 2 and 3, the threaded opening 42 being placed in registration with the lifter bore 36 and the opening 44 when the bushing member 30 is positioned therebeneath. The fastening member or set screw 40 fixedly secures the center support member 38 to the bushing member 30 and holds the bushing member 30 in place so that the boring bar 24 can be moved freely therethrough during a particular cutting operation.

Wedge or cam lock means are also associated with the center support member 38 to fixedly secure such member within the lifter bore 36. To this end, the center support member 38 includes a slot or opening 46 located on one side thereof intermediate its respective opposite end portions as best shown in FIGS. 2 and 3, the slot or opening 46 being dimensioned so as to removably receive a wedge member 48 positioned therewithin. The wedge member 48 includes a substantially flat outer surface portion 50 and a sloped or tapered inner surface portion 52 as best illustrated in FIG. 3. The wedge member 48 also includes a groove or channel 54 extending transversely across its outer surface 50 (FIG. 3), the groove 54 being dimensioned so as to receive a conventional rubber or elastic O-ring such as the O-ring 56 illustrated in FIGS. 2 and 3. In this regard, the outer cylindrical wall of the center support member 38 is likewise grooved or channelled to receive the O-ring member 56, the circumferential groove (not shown) associated with the center support member 38 being positioned and located so as to lie in registration with the groove or channel 54 when the wedge member 48 is positioned within the opening 46. It is also important to note that the depth of the groove 54 as well as the corresponding groove (not shown) associated with the center support member 38 is such that when the O-ring member 56 is positioned therewithin, the outer surface portion thereof lies substantially flush with the outer surface portion of both members 38 and 48. This enables the center support member 38 to be slidably positioned within any lifter bore 36 without interference from or other hindrance due to the O-ring member 56 extending beyond the outer periphery of both the center support member 38 and the wedge member 48. The O-ring member 56 holds the wedge member 48 in proper operating position within the slot or opening 46 and prevents the member 48 from falling out or becoming otherwise disengaged from the central support member 38. The O-ring member 56 also biases the wedge member 48 towards its fully retracted position within the opening 46 at all operative positions thereof as will be hereinafter explained.

The center support member 38 also includes a wedge expander member 58 which is threadably insertable into a threaded opening or passageway 60 as best shown in FIGS. 2 and 3. The expander member 58 is at least partially threaded as shown and includes a conically shaped tip portion 62. The threaded opening 60 is positioned and located within the member 38 so as to communicate with the opening 46 such that the conical tip 62 engages the tapered or sloped inner surface 52 of the wedge member 48 as best shown in FIG. 3. This means that when the wedge expander member 58 is threadedly moved within the threaded opening 60 such that the conical tip portion 62 engages the tapered surface portion 52 of the wedge member 48, further axial movement of the expander member 58 against the wedge member 48 will force the wedge member 48 outwardly against the biasing force exerted by the resilient O-ring member 56 and into engagement with the walls of the lifter bore 36 into which it is positioned. This action will wedge the center support member 38 within the lifter bore 36 thereby further securing the member 38 as well as the bushing member 30 in a fixed position within the cylinder head H. Axial movement of the expander member 58 within the threaded opening 60 will move the wedge member 48 between its fully retracted position wherein the outer surface portion 50 thereof lies substantially flush with the outer surface portion of the center support member 38 and its extended position wherein the outer surface portion 50 extends beyond the outer periphery of the member 38. Since the O-ring member 56 always urges the wedge member 48 towards its fully retracted position within the confines of the opening or slot 46, movement of the expander member 58 in the opposite direction and out of engagement with the wedge member 48 will allow the O-ring member 56 to return the wedge member 48 to its fully retracted position. Movement of the expander member 58 is preferably activated through the use of an Allen wrench, although other known means can likewise be utilized to accomplish this task. If an Allen wrench is utilized, the end portion 64 of expander member 58 should be appropriately configured to receive and engage the Allen wrench as shown in FIG. 2. Also, although use of the O-ring member 56 is preferred for the reasons set forth above, it is recognized that the present wedge lock mechanism will likewise work without the use of such biasing member.

Although use of the wedge lock means described above provides a strong, stable support arrangement for holding the boring bar at such intermediate location below one of the lifter bores 36, it is recognized that other means for holding and/or maintaining the center support member 38 within any one of the lifter bores 36 could likewise be utilized. It is also anticipated that a sufficiently tight frictional engagement between the center support member 38 and the lifter bore 36 into which it is positioned would likewise work equally as well. It is further anticipated that the support member 38 may be held and/or secured within the lifter bore 36 by means engageable with the exterior portion of the lifter bore 36 or any other component of the cylinder head H.

Typically, the boring bar 24 feeds from left to right and, when attached to the boring machine 10 adjacent the right end portion thereof, all of the cam shaft bores 34 can be re-bored in one operation. In this regard, however, it is important to remember that movement of the boring bar 24 within the bushing or collar member 30 is limited to a pre-selected length of travel in order to prevent the cutter members 28 located on either side of the bushing member 30 from engaging the member 30. This specific length of travel is pre-determined and the cutter members 28 and bushing member 30 are so positioned on the boring bar so as to achieve the desired length of travel to accomplish the particular boring operation. Once the boring operation is completed, the wedge member 48 is disengaged from contact with the lifter bore 36 by threadedly moving the expander member 58 upwardly out of engagement therewith and the threaded set screw 40 extending through the center support member 38 is threadedly disengaged from the bushing member 30. Thereafter, the center support member 38 is removed from the lifter bore 36 and the support arm members 20 are disengaged and removed from the boring bar 24 thereby freeing the boring bar for removal from the cylinder head.

Although the present invention is specifically directed to supporting a boring bar within the cam shaft bores of a particular type cylinder head, it is recognized that the present support means can be used or adapted for use on other types of cylinder heads as well as on engine blocks and other workpieces for re-boring crank shaft bores and the like so long as the center support member 38 can be positioned within a bore that is perpendicular to or extends radially relative to the axis of the in-line bores to be re-conditioned. Also, it is important to recognize that the present support means can be adapted and produced having different size and shape components as well as different numbers of such components so as to accommodate other in-line boring applications. Still further, it is likewise recognized that any number of the present support means, namely, the members 30 and 38, can be used to provide intermediate support for a boring bar in any number of lifter bores depending upon the overall size of the particular workpiece to be re-bored and the overall spanwise distance between the opposite end portions of such workpiece.

Similarly, it is also recognized that, depending upon the overall size of the workpiece to be re-bored and the location of the particular bore or bores to be re-bored, the boring bar may be adequately supported at just two locations along its length, one location being adjacent one end portion of the workpiece and the other location being at an intermediate location between the opposite end portions of the workpiece. In this particular situation, only one support arm member 20 and the present intermediate support means 30 and 38 need be utilized to provide adequate support to the boring bar along at least that portion of its length involved in the particular boring operation. Other combinations and variations in the arrangement and location of the support arm members 20 and the present support means 30 and 38 are likewise possible and anticipated including supporting a boring bar along its entire length solely at locations intermediate the opposite end portions of the workpiece without the use of any support arm members 20.

The present support mechanism therefore achieves all of the aforementioned objects and goals discussed above and can be easily and quickly engaged with and disengaged from the particular cylinder head or other workpiece to be re-bored thereby promoting and facilitating efficiency when a plurality of workpieces are to be re-conditioned.

Thus, there has been shown and described novel means for centrally supporting a boring bar intermediate the opposite end portions of a workpiece to be re-bored, which device fulfills all of the objects and advantages sought therefor. Many changes, modifications, variations and other uses and applications of the present invention will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. Means for supporting a boring bar within a workpiece during a boring operation wherein the workpiece includes spaced aligned bores at least one of which bores is to be re-bored, the workpiece further including at least one passageway extending radially therein relative to the axis of the aligned bores, said radial passageway being spaced axially from the bore to be re-bored, means for supporting the boring bar at least two locations along the length thereof including a member positionable on the boring bar and constructed to enable the boring bar to rotate freely therein, a locking assembly positionable within said radial passageway including means for attaching the locking assembly to said member positionable on the boring bar, and means to lock the locking assembly in said radial passageway.

2. The means for supporting a boring bar defined in claim 1 wherein said locking assembly includes a tubular member having a threaded member extending therethrough, said member positionable on the boring bar having a threaded orifice for receiving said threaded member, and means on the tubular member adjustable to apply pressure between said tubular member and the surface of said one radial passageway.

3. The means for supporting a boring bar defined in claim 1 wherein said member positionable on the boring bar and constructed to enable the boring bar to rotate freely therein includes an annular member.

4. Means for supporting a boring bar within a workpiece during a boring operation wherein said workpiece includes spaced aligned bores to be re-bored and at least one passageway extending radially relative to the axis of said aligned bores, said support means including means for supporting the boring bar at spaced locations along the length of said boring bar including a first member positionable on said boring bar at an intermediate location along its length, said first member being constructed so as to enable said boring bar to freely rotate when said first member is positioned thereon, a second member slidably positionable within said radial passageway, means for holding said second member within said radial passageway, and means for attaching said second member to said first member when the boring bar is positioned extending through said aligned bores.

5. The support means defined in claim 4 wherein said means for holding said second member within said radial passageway includes a wedge member slidably movable within said second member adjacent one side portion thereof, an elongated expander member positioned for axial movement within said second member, said expander member and said wedge member having cooperatively slidably engagable surface portions to change the position of said wedge member relative to the one side portion of said second member, movement of said expander member when engaged with said wedge member causing a corresponding movement of said wedge member in at least one direction thereof.

6. The support means defined in claim 5 including biasing means for holding and maintaining said wedge member within at least a portion of said second member in all operative positions thereof.

7. The support means defined in claim 6 wherein said biasing means includes a resilient member.

8. Support means for supporting a boring bar within a workpiece during a boring operation, said workpiece having a plurality of in-line bores and a plurality of passageways, each of said passageways having a longitudinal axis extending radially relative to the longitudinal axis of said in-line bores, said support means including means for supporting the boring bar adjacent the respective opposite end portions of said workpiece and at an intermediate location therebetween, said intermediate support means comprising a first member removably attachable to said boring bar and positionable at an intermediate location along its length, said first member including means enabling said boring bar to move relative thereto, a second member engageable with any one of said plurality of radial passageways, said second member including means for securing said second member within any one of said radial passageways, and means for attaching said first member to said second member when said boring bar is positioned within said plurality of in-line bores.

9. The support means defined in claim 8 wherein said first member includes an annular member, said annular member being sized and dimensioned so as to slidably receive said boring bar when positioned therethrough.

10. The support means defined in claim 8 wherein said means for securing said second member within any one of said radial passageways includes an opening formed on one side of said second member, a wedge member having a substantially flat outer surface and a tapered inner surface, said wedge member being slidably movable within said opening between a fully retracted position wherein the outer surface of said wedge member lies substantially flush with the outer surface of the one side of said second member and an extended position wherein the outer surface of said wedge member extends beyond the outer periphery of the one side of said second member, a first passageway extending from one end portion of said second member and lying in communication with said opening, an elongated expander member positioned for axial movement in said first passageway and having one end portion thereof conically tapered over at least a portion thereof for making contact with the inner tapered surface of said wedge member, and biasing means urging said wedge member towards its fully retracted position in all operative positions thereof, movement of said expander member when engaged with said wedge member causing a corresponding movement of said wedge member between its fully retracted position and its extended position.

11. The support means defined in claim 10 wherein said biasing means includes a first groove formed in said wedge member and extending transversely thereacross, a second groove formed in said second member and extending transversely therearound, and a resilient member positionable within said first and second grooves, said first and second grooves lying in registration with each other when said wedge member is positioned within said opening.

12. The support means defined in claim 11 wherein said first and second grooves are dimensioned such that the outer surface of said resilient member lies substantially flush with the outer surfaces of said wedge member and said second member when said resilient member is positioned therewithin.

13. The support means defined in claim 8 wherein said means for attaching said first member to said second member includes a second passageway through said second member extending the full length thereof, a threaded opening formed in said first member, and an elongated fastener member positioned extending through the second passageway in said second member and engagable with the threaded opening in said first member when said threaded opening is placed in registration with said second passageway.

14. In a boring machine for boring a plurality of spaced aligned bores in a workpiece, said boring machine including a boring bar extending through said plurality of aligned bores, said workpiece having at least one passageway disposed radially to the axis of said plurality of aligned bores, the improvement comprising support means for supporting said boring bar within said plurality of aligned bores at spaced locations therealong including a first annular member slidably positionable on said boring bar, said first member being positionable beneath any one of said radial passageways when said boring bar extends through said plurality of aligned bores and being constructed to enable said boring bar to freely rotate therein, a second member positionable within one of said radial passageways and including means for maintaining said second member within said radial passageway, and means for attaching said second member to said first member when said first member is positioned beneath the radial passageway into which said second member has been located.

* * * * *